United States Patent
Pohjola

(10) Patent No.: US 11,524,908 B2
(45) Date of Patent: Dec. 13, 2022

(54) REJECT VALVE OF REVERSE OSMOSIS DEVICE

(71) Applicant: SOLAR WATER SOLUTIONS OY, Espoo (FI)

(72) Inventor: Heikki Pohjola, Espoo (FI)

(73) Assignee: SOLAR WATER SOLUTIONS OY, Espoo (FI)

(*) Notice: Subject to any disclaimer, the term of this patent is extended or adjusted under 35 U.S.C. 154(b) by 227 days.

(21) Appl. No.: 16/623,597

(22) PCT Filed: Jun. 12, 2018

(86) PCT No.: PCT/FI2018/050438
§ 371 (c)(1),
(2) Date: Dec. 17, 2019

(87) PCT Pub. No.: WO2019/008223
PCT Pub. Date: Jan. 10, 2019

(65) Prior Publication Data
US 2021/0139349 A1 May 13, 2021

(30) Foreign Application Priority Data
Jul. 5, 2017 (FI) .................................. 20175650

(51) Int. Cl.
| | | |
|---|---|---|
| *F16K 1/38* | (2006.01) | |
| *C02F 1/44* | (2006.01) | |
| *F16K 15/06* | (2006.01) | |
| *F16K 17/06* | (2006.01) | |
| *F16K 17/20* | (2006.01) | |

(52) U.S. Cl.
CPC ............ *C02F 1/441* (2013.01); *F16K 1/38* (2013.01); *F16K 15/063* (2013.01); *F16K 17/06* (2013.01);
(Continued)

(58) Field of Classification Search
CPC .......... F16K 1/38; F16K 15/063; F16K 17/06; F16K 17/20
(Continued)

(56) References Cited

U.S. PATENT DOCUMENTS 2,638,582 A * 5/1953 Urso ................... G01F 1/26
116/268
2,750,958 A * 6/1956 Baker ................ F16K 15/063
137/515.7
(Continued)

FOREIGN PATENT DOCUMENTS

| CN | 102333980 A | 1/2012 |
| EP | 0995482 A2 | 4/2000 |

(Continued)

OTHER PUBLICATIONS

Extended European Search Report for Application No. 18828097.8-1202 / 3648872 PCT/FI2018050438 dated Mar. 4, 2021.
(Continued)

*Primary Examiner* — P. Macade Nichols
(74) *Attorney, Agent, or Firm* — Tarolli, Sundheim, Covell & Tummino LLP

(57) ABSTRACT

A reject valve of a reverse osmosis device, which is especially suited for brackish water reverse osmosis devices, which require a low system pressure less than 15bar. The valve keeps the system pressure substantially constant in a pre-defined range of the reject volume. The size of the inflow channel is adjusted by a spring-operated cone, which never entirely closes the channel, which forms a constant throttle until the pressure of the inflow has risen to approximately three quarters of the pressure arranged by the spring and prevailing at maximum volume of the reject flow. This operation is arranged structurally such that onto the shaft of the cone is fixedly supported a transverse plate abutting the inner wall of the body, which as pressed by the compression spring is supported by the end of an element connected to the end of the body, wherein the cone is in its lowest position.

2 Claims, 2 Drawing Sheets

(52) U.S. Cl.
CPC ........ *F16K 17/20* (2013.01); *C02F 2201/005* (2013.01)

(58) Field of Classification Search
USPC .......................................................... 137/469
See application file for complete search history.

(56) References Cited

U.S. PATENT DOCUMENTS

| | | |
|---|---|---|
| 9,644,356 B1 | 5/2017 | Gass et al. |
| 2004/0000342 A1 | 1/2004 | Hideaki |
| 2011/0277856 A1 | 11/2011 | Lee |

FOREIGN PATENT DOCUMENTS

| | | |
|---|---|---|
| FR | 2559872 A1 | 8/1985 |
| JP | S6412980 U | 1/1989 |
| WO | 2010/098621 A2 | 9/2010 |

OTHER PUBLICATIONS

Finnish Search Report for Application No. 20175650 dated Jan. 15, 2018.

International Search Report for Application No. PCT/FI2018/050438 dated Sep. 10, 2018.

Applicant: Solar Water Solutions OY; Chinese Application No. 2018800409109 Filed Jun. 12, 2018; Chinese Search Report dated Aug. 26, 2021; 2 pgs.

* cited by examiner

REJECT VALVE OF REVERSE OSMOSIS DEVICE

RELATED APPLICATIONS

The present invention is a U.S. National Stage under 35 USC 371 patent application, claiming priority to Serial No. PCT/FI2018/050438, filed on 12 Jun. 2018; which claims priority of FI 20175650, filed on 5 Jul. 2017, the entirety of both of which are incorporated herein by reference.

A reject valve of a reverse osmosis device that throttles the reject flow and maintains the system pressure at a pre-set level and substantially constant.

It is known that by throttling the flow exiting as reject from a reverse osmosis module, the prevailing pressure in the module can be adjusted, while water is fed into the module by a high pressure pump. A module refers to a conventional, standardized tubular pressure vessel, and a reverse osmosis membrane inside of it. As the flow of salt water passes through the module, the membrane separates fresh water from it. The remaining concentrate, from which fresh water has been separated, is called the reject.

A reverse osmosis unit may have several modules connected in series and/or in parallel, but the reject of the system exits through one channel, wherein, by the throttle created by this reject valve, the pressure of the system can be defined and, consequently, also the backpressure of the feed pump.

In a reverse osmosis system, the membrane type defines the limit values of the volume of the feed flow. The flow volume of the reject is always lower than the volume of the feed flow. The relationship between these depends on the volume of the feed flow, the number of modules, the salinity of feed water, the system pressure and the temperature. The higher the concentration of solid substances dissolved into the water, mainly of salts (TDS=total dissolved solids), the higher the osmotic pressure of the water. In order for the membrane to separate fresh water from salt water, the prevailing pressure in the module must be higher than the osmotic pressure of the concentrate flowing through the module. The fresh water separated by the membrane is called as its yield.

If on the reject side is used a constant throttle, such as a hole throttling the flow, the system pressure changes if the number of modules is changed, but the volume of the feed flow remains unchanged. The same happens if the water salinity changes. This is due to the fact that, in these situations, the yield of the membrane and, correspondingly, the reject volume changes.

Constant throttle is suitable only in a situation, where the volume of the feed flow is constant and the yield of the membrane remains constant. When using constant throttle, also a disadvantage is formed in that the yield of the membrane changes as the temperature of the water varies, and the yield also decreases as the membrane ages, wherein the volume of the reject in relation to the feed flow increases, correspondingly.

In small reverse osmosis devices, which are intended for low-salinity brackish water and the yield of which is a few tens of litres per hour, as a valve throttling the reject flow is generally used a manually adjustable needle valve, which is adjusted to the desired throttle level as the system is started. The practical disadvantage is that the yield of the membrane begins to stabilize only once the system has been used for some time. On the throttle valve might also collect salt scale, which changes its flow cross-section.

In practice, a manual throttle valve requires constant monitoring of the pressure of the reverse osmosis system and adjustment of the pressure.

A reject valve according to the invention obviates the aforesaid disadvantage. It suits exceptionally well for low-salinity water (TDS <10,000 mg/litre) and system pressures below 15bar. The valve operates automatically and dynamically, keeping the system pressure at a desired pre-set level in a pre-defined reject flow volume range. Due to this characteristic, the valve provides that the electric motor of the high pressure pump of the reverse osmosis unit can be used via an inverter, also using solar or wind energy, without batteries, wherein the RPM of the feed pump and, correspondingly, the volume of the feed flow varies according to the energy obtained, as a result of which the fresh water and reject volumes produced by the system in a unit of time vary accordingly.

Structurally, spring-operated valves, such as a pressure relief valve, a safety valve, a by-pass valve and a check valve, are all reminiscent of each other, but their operating principles and use are different. A valve according to the invention is most similar with a conventional check valve, FIG. 1, and a by-pass valve, FIG. 2. Within a tubular body, the check valve has a wall breaking the flow and, therein, a round flow hole, which is closed by a conical element. A compression spring supported at the other end to the body pushes the cone against the perimeter of the hole. The spring keeps the cone in place until the pressure directed onto the cone by the inflow grows as high as the cracking force of the spring keeping the cone in place. It is characteristic of the check valve that the channel opens in a skip-like manner. This is due to the fact that the surface of the cone, onto which the pressure of the flow is directed when the valve is shut, increases immediately as the channel opens, because the pressurized flow now flanks the entire cone. After this, the pressure force directed onto the cone decreases. It is essential for the operation of the check valve that the volume of the inflow is adequately high because, once the valve opens, the flow pressure around the cone rapidly decreases and the spring force pushes the cone backwards, which then results in an increase of pressure. When the volume of the inflow is low, the cone begins to hack at the hole. The apex angle of the cone of the check valve must be so large, preferably blunt, that, if the valve is shut, the cone as pressed by the spring does not get stuck in the flow opening. The check valve is exceptionally poorly suited for the adjustment of pressure and its purpose is to resist the inflow as little as possible as well as to close the channel when the flow returns back.

The by-pass valve, in turn, opens, when the pressure on the input side increases to exceed a limit prescribed for it. Bypass wastes the energy of the pressure pump.

As for the check valve, characteristic also of a reject valve according to the invention is a straight, tubular structure of the body, from one end of which the flow is led in and from the other end out, and the body includes a cone, which, by means of a compression spring, affects the cross-section of the flow channel. The body is attached to the inlet and outlet pipe of the flow by threaded connections. Otherwise, it differs from the aforesaid valves substantially in its purpose, structure and operating principle. The magnitude of the through flow of the flow channel may be obtained approximately from the formula $Q = C_D \cdot A \cdot (2 \ g \cdot H)^{1/2}$, where Q [m$^3$/s]; $C_D$ is a constant depending on the shape of the channel; A [m$^2$]; g is 9.81 m/s$^2$ and H is the height of the pressure in metres, wherein 10bar corresponds to 100 m. The figures in the calculations must, however, be converted to a cm³ and mm² scale. It is apparent from the formula that using constant throttle, when the volume of the flow increases, for example, by forty percent, the pressure increases by one hundred percent. On the other hand, correspondingly, if the cross-section of the channel were to increase by forty percent, the pressure would remain constant. Formed by the cone and the hole, the annular cross-section of the flow increases the cross-section of the flow less in terms of percentage in relation to the rise of the cone, the higher the cone has risen from the initial state.

FIG. 1 is a conventional check valve, in its structure most similar with the invention.

FIG. 2 is a by-pass valve most similar with the invention.

FIG. 3 is the cross-section of the valve in the axial direction and shows the basic structure of the valve.

FIG. 4 shows how the valve is connected into its operational environment.

FIG. 5 shows the valve as it dynamically adjusts the flow.

In the following, the invention and the structure of the reject valve are described by means of example, with reference to the accompanying FIGS. 3-5.

Figure 1:
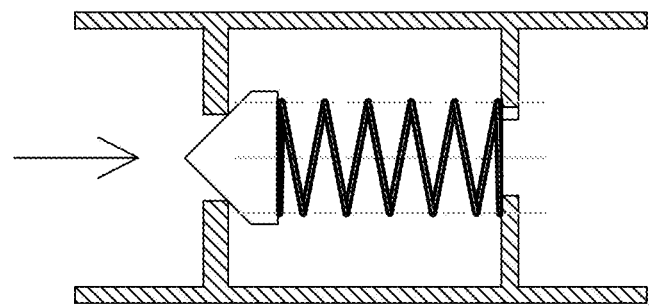
FIG. 1 and FIG. 2 show known art.
Figure 2:
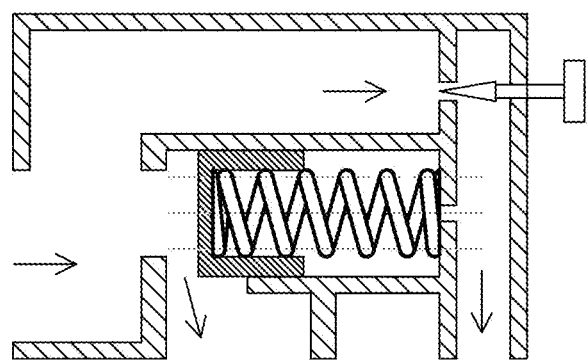
Figure 3:
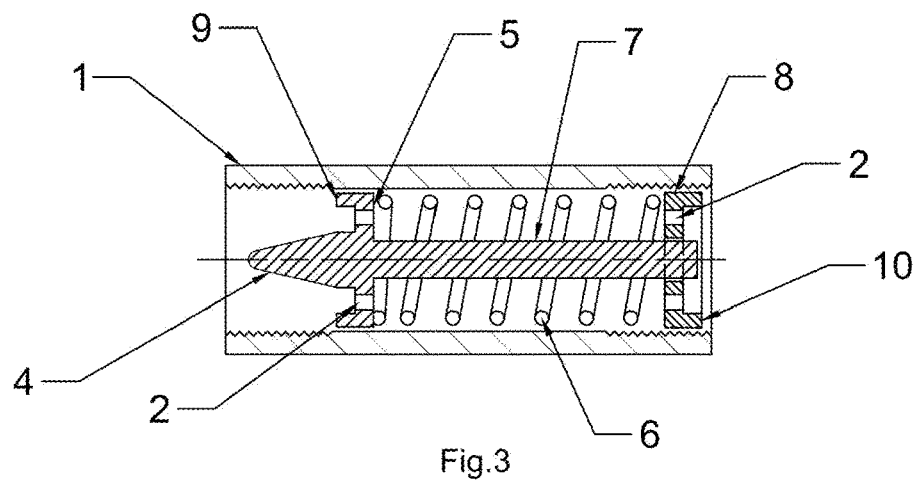
FIG. 3-FIG. 5 show the structure and operating principle of a valve according to the invention.

FIG. 3 shows the cross-section of the reject valve in the axial direction. The body 1 includes a freely moving cone needle 4, 5, 7, onto the shaft 7 of which is fixedly supported a plate-like element 5 (hereafter a restrictor plate), which abuts the inner wall of the body 1. On the edge of the restrictor plate 5 on the side of the cone 4, there is an annular washer 9 or corresponding rising. The guide plate 8 is unattached and abuts at its perimeter the inner wall of the body 1. In the middle of it is a hole, the perimeter of which abuts the shaft 7 of the cone 4 and it has a corresponding washer 10. These washers 9,10 form an integral part of the plates 5 and 8. Around the shaft 7, between the restrictor plate 5 and the guide plate 8, is a compression spring 6. The plates 5,8 guide the movement of the cone in the axial direction. This is the basic structure of the valve.

Figure 4:
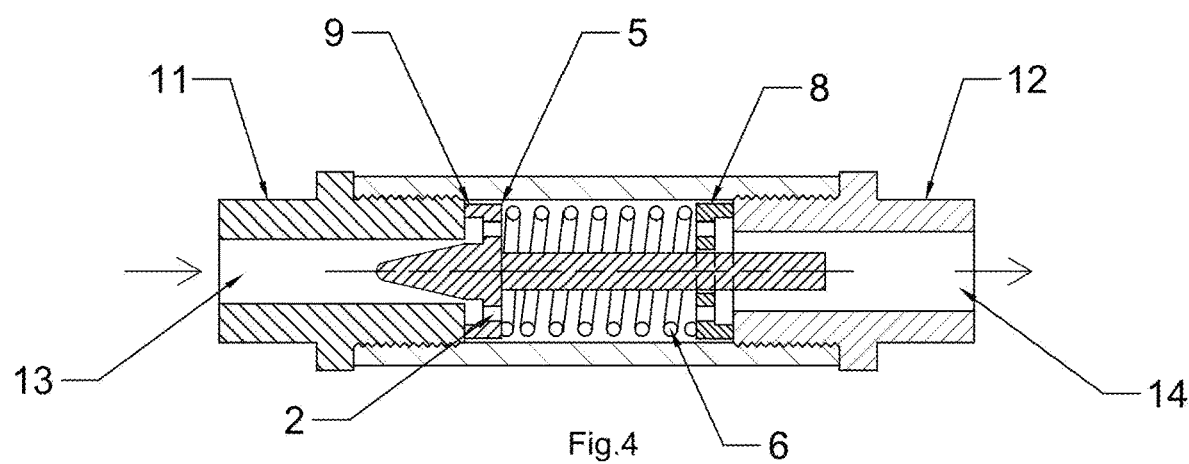

In FIG. 4, the body 1 of the valve is at its ends connected by a thread to the standard pipe connectors 11, 12. These connectors have channels 13, 14 with standardized cross-sections, from which different magnitudes are to be selected. The body 1 of the valve and the cone 4 are suitably dimensioned for the selected connectors. When the connectors 11,12 are installed in the body 1, the spring 6 compresses between the plates 5,8, wherein the plates 5,8, as pressed by the spring 6, are supported by the end of the connectors 11,12. At the same time, the cone 4 closes the flow channel 13 of the connector 11 to a pre-defined degree, the restrictor plate 5 preventing the cone 4 from getting deeper into the channel 13. In this state, the cone 4 is in its lowest position, but does not entirely close the channel 13, instead it always allows through flow up to a defined volume of flow. In the following, when it is mentioned that the cone 4 is in its lowest position, exactly said state is meant, which is also the constant throttle state of the valve. The height of the skid 9 of the restrictor plate 5 and the magnitude of the cone angle can be used to define the minimum cross-section allowing the flow of the inflow channel. Into the restrictor plate 5 are arranged one or more channels 2 allowing flow, the cross-section of which is substantially larger than the maximum cross-section of the flow of the channel adjusted by the cone 4. The guide plate 8 has a corresponding channel 2.

The fact that the reject valve always allows through flow is also preferred for a reverse osmosis system because, as the high pressure pump starts, the pressure in the system increases more slowly, which is preferable for the membranes, nor is a so-called water hammer able to occur. As the system stops, there also remains no pressure in the modules, which decreases the possibility of salt scaling on the surface of the modules.

The pressure created by the volume of the through flow, just before the cone 4 begins to open the flow channel wider, is preferably 75% +/−20% of the maximum pressure of the reject flow of the system. The maximum pressure, in turn, is achieved by the maximum volume of the reject, i.e. when the volume of the feed flow is at its maximum. The maximum volume of the feed flow is, in turn, a quantity characteristic to the feed pump. The maximum volume of the reject depends, in addition to the volume of the feed flow, also on the system pressure, temperature, membrane type and water salinity. Formed by the cone 4 and the channel 13, the cross-section of the flow channel 13 for the maximum volume of the reject can be defined by the cone 4 and the spring 6 such that the pressure of the inflow is in dimensioning conditions substantially the magnitude of the desired system pressure. Because the valve always allows flow, the entire surface area of the cone needle 4, 5, 7, onto which the pressure of the inflow is directed, does not substantially change, thus the movement of the cone 4 as the volume of the flow increases is relatively slight and quite uniform, and the cone needle 4, 5, 7 does not hack back and forth even at low volumes of flow.

Figure 5:
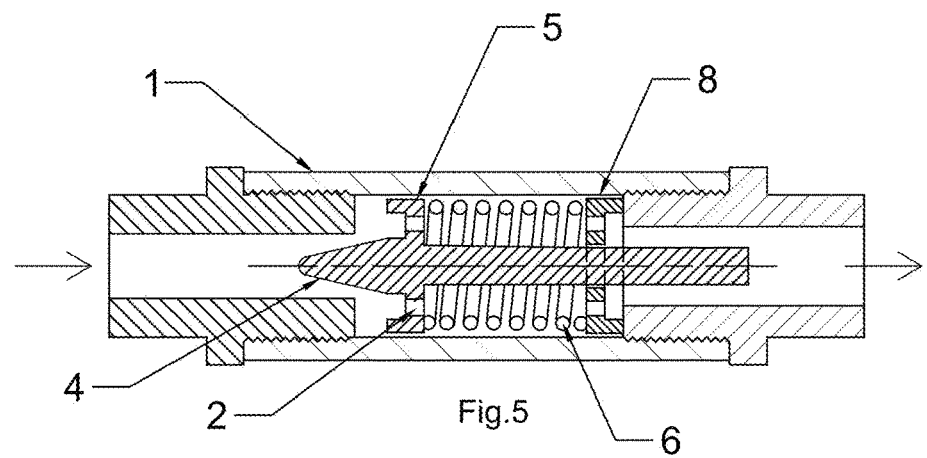

FIG. 5 shows the valve as it dynamically adjusts the flow.

When the feed flow of the pump increases adequately, the cone 4 begins to move and the spring 6 begins to compress as the spring force increases correspondingly. The cone 4 rises to its maximum when the inflow is at its maximum. In this case, the reverse osmosis module has attained an operational pressure.

The magnitude of the spring force of the valve is defined such that, in the reverse osmosis system, at a maximum flow produced by the feed pump and, consequently, at a maximum reject flow, wherein the spring 6 is maximally compressed, the magnitude of the annular flow channel is such that throttle causes on the feed side of the flow a pressure of the desired magnitude. The magnitude of this channel may be approximately calculated mathematically, however, in practise, exactly the desired spring force in relation to the volume of the reject flow may only be obtained as the result of experimental testing. Experimentally may also be defined the volume range of the reject flow, whereby one and the same valve provides the sought-after system pressure with adequate accuracy. The special structure of the valve also provides that the apex angle of the cone 4 may be sharp, wherein the characteristic of the cone 4 dynamically adjusting the flow is good as it moves in the flow opening. The movement of the cone 4 is slight as it rises from its lowest position to its maximum, as a result of which the change in spring force is slight and the pressure in the system remains substantially constant.

The invention claimed is:

1. A reject valve of a reverse osmosis device that throttles a reject flow and maintains a system pressure at a pre-set level and substantially constant, the valve including a straight, tubular body, from one end of which the flow is led in and from another end out, and the body contains a conical element, which affects the cross-section of an inlet channel by means of a pre-tensioned compression spring installed around a shaft of the conical element, the spring being supported at an opposite end of the conical element indirectly to the body, wherein the conical element never entirely closes the inlet channel, which is a middle hole of a first element, being thread jointed to a first end of the body, and this is arranged so that onto the shaft of the conical element is fixedly supported a restrictor plate, which is supported by an end of the first element as pressed by the compression spring, and the restrictor plate prevents the conical element from getting deeper into the channel, and into the restrictor plate is arranged a flow channel, which allows also flow in this state and the flow channel is larger in cross-section than the channel adjusted by the conical element at its maximum, and a spring force is adjusted such that the reject flow has a constant throttle until the pressure of the flow reaches 75%+/−20% of a maximum pressure of the system defined by the spring, wherein the conical element begins to move and dynamically adjust the flow cross-section of the channel according to a change in a volume of the flow.

2. A valve according to claim 1, wherein the shaft of the conical element is guided by a guide plate abutting an inner wall of the body, and in a middle of the plate there is a hole abutting the shaft of the conical element, the shaft is being able to freely move through the hole, and the guide plate is supported, as pressed by the spring, by a second element connected with a thread joint to the other end of the body, and into the guide plate is arranged a flow channel.

* * * * *